(12) United States Patent
Ahlinder

(10) Patent No.: US 9,869,254 B2
(45) Date of Patent: Jan. 16, 2018

(54) METHOD FOR DETERMINING FUEL BLEND IN A DUAL FUEL MIXTURE

(71) Applicant: VOLVO TRUCK CORPORATION, Göteborg (SE)

(72) Inventor: Sven Ahlinder, Sävedalen (SE)

(73) Assignee: Volvo Truck Corporation, Göteborg (SE)

( * ) Notice: Subject to any disclaimer, the term of this patent is extended or adjusted under 35 U.S.C. 154(b) by 88 days.

(21) Appl. No.: 14/778,791

(22) PCT Filed: Mar. 27, 2013

(86) PCT No.: PCT/EP2013/000922
§ 371 (c)(1),
(2) Date: Sep. 21, 2015

(87) PCT Pub. No.: WO2014/154227
PCT Pub. Date: Oct. 2, 2014

(65) Prior Publication Data
US 2016/0047325 A1    Feb. 18, 2016

(51) Int. Cl.
*F02D 19/08*    (2006.01)
*F02D 41/24*    (2006.01)
(Continued)

(52) U.S. Cl.
CPC ........... *F02D 19/088* (2013.01); *F02D 19/08* (2013.01); *F02D 19/084* (2013.01);
(Continued)

(58) Field of Classification Search
CPC ...... F02D 19/08; F02D 19/084; F02D 19/085; F02D 19/087; F02D 19/088; F02M 37/0064
(Continued)

(56) References Cited

U.S. PATENT DOCUMENTS 5,697,346 A    12/1997    Beck
6,016,796 A    1/2000    Dalton
(Continued)

FOREIGN PATENT DOCUMENTS

CN    102042105 A    5/2011
EP    2228528 A2    9/2010
JP    2008280893 A    11/2008

OTHER PUBLICATIONS

International Search Report (Feb. 7, 2014) for corresponding International application No. PCT/EP2013/000922.
(Continued)

*Primary Examiner* — Mahmoud Gimie
(74) *Attorney, Agent, or Firm* — WRB-IP LLP

(57) ABSTRACT

A method is provided for determining fuel blend in a dual fuel mixture including a first and a second fuel in an internal combustion engine. The method includes the steps of measuring multiple engine parameters using sensors during transient cycle operation for a predetermined range of engine loads and fuel blends; using system identification of transient time series of the measurements to determine one or more relevant engine parameters; determining a model for estimation of the fuel blend based on said one or more engine parameters; using the model for determining a current fuel blend during transient operation using current measured values of the one or more engine parameters, and using the calculated current fuel blend for controlling the amount of dual fuel mixture injected into each cylinder of the internal combustion engine. A vehicle and a computer program product using the method are also provided.

16 Claims, 12 Drawing Sheets

(51) Int. Cl.
  *F02D 41/26* (2006.01)
  *F02D 41/00* (2006.01)
  *F02D 41/14* (2006.01)
  *F02B 37/24* (2006.01)

(52) U.S. Cl.
  CPC ......... *F02D 19/085* (2013.01); *F02D 19/087* (2013.01); *F02D 41/0025* (2013.01); *F02D 41/0027* (2013.01); *F02D 41/2432* (2013.01); *F02D 41/26* (2013.01); *F02B 37/24* (2013.01); *F02D 41/0007* (2013.01); *F02D 41/0072* (2013.01); *F02D 41/1405* (2013.01); *F02D 41/1446* (2013.01); *F02D 41/1448* (2013.01); *F02D 2041/1409* (2013.01); *F02D 2041/1423* (2013.01); *F02D 2200/021* (2013.01); *F02D 2200/0406* (2013.01); *F02D 2200/0414* (2013.01); *F02D 2200/0612* (2013.01); *F02D 2200/101* (2013.01); *Y02T 10/36* (2013.01)

(58) Field of Classification Search
  USPC .................. 701/104; 123/299, 300, 304, 575
  See application file for complete search history.

(56) References Cited

U.S. PATENT DOCUMENTS

| | | | |
|---|---|---|---|
| 6,321,721 | B1 | 11/2001 | Okumura et al. |
| 8,893,665 | B2* | 11/2014 | Surnilla ................. F02D 41/04 123/1 A |
| 2011/0125383 | A1 | 5/2011 | Vassallo et al. |
| 2012/0303245 | A1* | 11/2012 | Wang .................. F02D 19/0615 701/104 |
| 2013/0261935 | A1* | 10/2013 | Jankovic ............... F02D 41/047 701/104 |

OTHER PUBLICATIONS

Chinese Official Action (with Int'l-style search report) (May 3, 2017) for corresponding Chinese Appl 201380075206.4.

* cited by examiner

METHOD FOR DETERMINING FUEL BLEND IN A DUAL FUEL MIXTURE

BACKGROUND AND SUMMARY

The present invention relates to a method for determining fuel blend in a dual fuel mixture. The method allows for real-time estimation of the fuel blend in a fuel having variable fuel and combustion properties depending on the blend, providing optimal engine operation for any blend in the dual fuel mixture.

Biodiesel can be used in pure form or may be blended with petroleum diesel at any concentration in modern diesel engines. The use of biodiesel will increase in the future especially due to the advantages of such type of fuel. In particular using biodiesel has the effect of a particulate reduction up to 80%. Furthermore, biodiesel gives the possibility of recalibrating the Soot-NOx trade-off in order to eliminate increase of NOx. Also it gives the possibility of reducing the regeneration frequency of the diesel particulate filter. However, the use of biodiesel may incur problems; for example with biodiesel fuel, cold start of the motor may be more difficult, especially at low temperatures, with respect to conventional diesel. A further problem is given by increased oil dilution due to the evaporation properties of biodiesel. Moreover use of biodiesel will have the effect of reducing the power of the motor by 7-10%. Furthermore use of biodiesel may lead to an increase of nitrogen oxides emission up to 60%.

While the materials compatibility challenges have largely been met in "flexi-fuel" vehicles, the engine and aftertreatment operation has not been optimized as a function of fuel type (i.e. ethanol, bio diesel, etc.). The full-scale introduction of alternative fuels often occurs as blends with conventional fuels. This is seen to some extent with the limited introduction of E85 (85% ethanol, 15% gasoline) and B20 (20% bio diesel, 80% conventional diesel). One example of a bio diesel is RME, which is the methyl ester of rapeseed oil. The challenge is to accommodate variable fuel properties, as there will be differences in combustion properties due to both the type of alternative fuel (i.e. pure bio diesel versus, pure diesel) and blend ratio i.e. B20 (20% bio diesel, 80% conventional diesel) versus B80 (80% bio diesel, 20% conventional diesel). Real-time estimation of the fuel blend is a key factor to the optimized use of two-component fuels (e.g. diesel-bio diesel, gasoline-ethanol, etc.).

Biodiesel, or RME, as a renewable alternative fuel for petroleum based diesel fuel produces lower emissions of all types (CO, HC, etc.) except nitrogen oxides (NOx) when compared to the petroleum diesel fuel. Reducing NOx produced from engines running on biodiesel is a challenging task to be able to meet the emission requirements. Knowledge of fuel blend is necessary for control and adaptation purposes to tune the engine control system parameters leading to lower NOx emission and improved engine performance. RME can be used in different blends with conventional diesel and estimating the percentage of the biodiesel fuel is useful for estimation of fuel injection rate per engine cycle and the produced power from the engine.

RME has lower heating value compared to the conventional diesel so to achieve the same power; more RME fuel must be used. Alternatively, for the same amount of diesel fuel and RME fuel, there will be a different level of torque generated. Hence, a further problem is to provide an accurate estimate the RME content of the fuel to optimize both the fuel consumption information of the engine and the torque produced by the engine.

It is desirable to enable the detection of biodiesel in the vehicle tank in order to provide an estimate of the percentage volume of biodiesel as accurate as possible. It is also desirable to provide this estimate without using dedicated sensors and using only existing engine sensors and data already available to the ECU.

The invention relates, according to an aspect thereof, to a method for determining fuel blend in a dual fuel mixture.

According to a preferred embodiment, the invention relates to a method for determining fuel blend in a dual fuel mixture comprising a first and a second fuel in an internal combustion engine. The method comprises the steps of:
  measuring multiple engine parameters using sensors during transient cycle operation for a predetermined range of engine loads and fuel blends and transmitting sensor signals to an electronic control unit
  using system identification of transient time series of the measurements to determine one or more relevant engine parameters;
  determining a model for estimation of the fuel blend based on said one or more engine parameters;
  using said model for determining a current fuel blend during transient operation using current measured values of said one or more engine parameters, and
  using the calculated current fuel blend for controlling an engine in response to the current fuel blend.

According to the method, actual and time delayed, linear and cross-terms, in-data are used during system identification to determine the relevant parameters.

According to the invention, the method involves using at least one engine parameter comprising the exhaust manifold temperature, the engine speed, the exhaust manifold pressure, the exhaust gas recirculation mass flow, a fuel injection parameter such as the integral portion of the regulation for the fuel injection, the intake manifold pressure, the intake manifold temperature, a torque value demanded by the engine control unit, the variable geometry turbocharger position and/or the cooling water temperature. This is a non-exhaustive list of parameters and additional available sensor values that can be used depending on the engine model used.

Engine tests using 7% (B7), 50% (B50) and 100% RME (B100) in diesel have been performed and will be described in further detail below. The RME content has been modelled from transient conditions using available sensor values for a number of engine parameters. In an example given below, the parameters selected are exhaust manifold temperature, engine speed, exhaust manifold pressure, EGR mass flow, a fuel Injection parameter, intake manifold pressure, intake manifold temperature, demanded torque (torque requested by the engine control unit), VGT (variable geometry turbine) position/demand and cooling water temperature. Optionally, to make the model more robust/accurate, additional sensor values can be used.

The tests show that it is possible to use available sensors of the engine to detect the ratio of RME in the mixed diesel fuel (VSD10) in transient conditions. By using a model applied using the method according to the invention the ratio of RME in the diesel can be estimated in transient state conditions during operation of the vehicle.

The tests were performed on a 13 liter (420 hp) Euro V engine without EGR. Euro V is the current emission standard for heavy vehicles sold in the EU. The engine after treatment system (EATS) system was a US10 system with both a diesel particular filter (DPF) and a selective catalytic reactor (SCR). US10 is the regulations for the US emission standard for 2010. In addition to the standard preparation of emission-, temperature and pressure-sensors, The RME fuels used for collecting training data were B7 and B100.

This model is not directly applicable on other engine models. For instance, a Euro VI (EU standard for 2014) engine might have different sensors and some engine versions will include EGR and turbo-compound. This makes it necessary to recalibrate the model for each engine.

The engine was run transient in the test cycles and transient in the certification cycles Suitable test cycles are 'Duty Cycle' (City3 cycle), 'WHTC', and 'WHSC'. The cycles are standardized driving cycles determined by various international and national authorities. The Duty Cycle, or City3 cycle is a transient cycle used for buses in urban traffic. The World Harmonized Transient Cycle (WHTC) test is a transient engine dynamometer schedule defined by the global technical regulation (GTR) No. 4 developed by the UN ECE GRPE group. The GTR is covering a world-wide harmonized heavy-duty certification (WHDC) procedure for engine exhaust emissions. The regulation is based on the world-wide pattern of real heavy commercial vehicle use. Two representative test cycles, a transient test cycle (WHTC) with both cold and hot start requirements and a hot start steady-state test cycle, or the World Harmonized Stationary Cycle (WHSC), have been created covering typical driving conditions in the EU, USA, Japan and Australia.

The model was trained (calibrated) and tested (validated) transient, which allows the model to be used on an engine at any time during operation of the vehicle. All tests were performed in room temperature.

The engine parameters used for the transient model for the specific engine tested in the attached example are exhaust manifold temperature, engine speed, exhaust manifold pressure, EGR mass flow, a fuel Injection parameter, intake manifold pressure, intake manifold temperature, demanded torque, VGT position/demand and cooling water temperature. As indicated above, using additional sensor values can increase the precision of the transient model. The parameters to be used in the transient model are determined using system identification. In control engineering, system identification uses statistical methods to build mathematical models of dynamical systems from measured data. A common approach is therefore to start from measurements of the behaviour of the system and the external influences (inputs to the system) and try to determine a mathematical relation between them without going into the details of what is actually happening inside the system. This approach is called system identification.

During training of the model in transient mode the engine is run on B7 and B100. The model is subsequently tested in a transient cycle on a B50 mixture of the fuels.

The fuel quality model (FQM) method according to the invention is transient. This means that it remembers the previous measured parameter value, which is valuable when detecting RME levels on transient real life cycles. The cycle considered here is City3 and is a city bus driving cycle.

For the WHSC only peak torque (A100) and peak rated power (C100) are considered for the FQM. This cycle is not a road cycle but is used just for certification.

The engine was run in the City3 cycle to prepare it before certification. The FQM has good convergence properties in this cycle. The in-data is centered and scaled, which means that the average of the in-data is subtracted and the data is divided by the standard deviation.

During system identification the actual and time delayed, linear and cross-terms, in-data are considered to determine the relevant parameters. All terms deemed to be relevant are multiplied with a coefficient each and added together as described below. The result is the mixture value in RME %.

Fitting time-series data to each other is called time-series analysis or system identification. Here, the in-data table or matrix is considered as the A matrix and the two RME levels are considered as y in the system of equations $Ax=y$.

A system of equations can be solved in many ways. The method chosen here is Partial Least Squares (PLS). The reason for this choice is that PLS is less sensitive for correlated columns in A than many other methods. Particularly when using time dependent in-data, there is almost a perfect correlation between the different columns. In Matlab™, the programming language chosen, there is no implementation of selecting how many components that should be used. A diagram of fit function of components has been used to see where the fit stops improving and this number of components is used.

Time dependent data is when a column, for instance EGR mass flow, is copied to a new column in the A matrix. Then the column is lagged which means that you remove the first observation and replaces it by the second. Then you replace the second observation with the third and so on. This variable is called "EGR mass flow (t−1)". When the system $Ax=y$ is solved, using PLS, with this new variable, each RME value is not only dependent of the present EGR value but also the previous. This is called a time dependent or transient model.

Interaction terms are also used in the matrix A. The idea behind these terms is that the dependence of one parameter, for instance EGR mass flow, could be dependent of another parameter, for instance inlet manifold temperature. Then a new column is added to matrix A which consists of the numbers in the EGR vector multiplied with the numbers in the inlet temperature vector and $AX=b$ is solved. This gives a term (EGR mass flow)*(inlet-pressure).

In total there are just over 100 coefficients in the model, which means that the 10 original columns in matrix A have been increased by a factor 10.

The convergence criteria consist of a time dependent averaging of RME % observations in the engine. This leads to that the average RME % in a time span will converge. When the difference between maximum and minimum value is inside a certain interval the result of the FQM is delivered as an RME % in the fuel.

Known regression methods are often referred to as neural networks. The regression model used here, Partial Least Squares, can be described as a "backwards propagation neural network using linear transfer functions and orthogonal coefficients in one layer".

Using models with fewer degrees of freedom than the dataset gives opportunities to test the model. The way it is done here is to perform a cross validation which means systematically excluding parts of your dataset, building the model on the rest of the data, and trying to predict the excluded values. This has been used for this model and the internal consistency is good. The validity of the model is then tested in transient mode.

As indicated above, RME has lower heating value compared to the conventional diesel so to achieve the same power; more RME fuel must be used. For the same amount of diesel fuel and RME fuel, there will be a different level of torque generated.

The method according to the invention results in a model that provides an accurate estimate the RME content of the fuel and allows both the fuel consumption information of the engine and the torque produced by the engine to be optimized.

The calculated current fuel blend can be used for controlling the engine, for instance, by adjusting the amount of dual fuel mixture injected into each cylinder of the internal combustion engine, the exhaust gas recirculation mass flow, or the variable geometry turbocharger position. This is a non-exhaustive list of engine parameters that can be controlled in response to the current fuel blend.

The invention further relates, according to an aspect thereof, to a vehicle comprising an internal combustion engine arranged to be controlled by a method according to an aspect of the invention. The engine is operated using the model achieved by the above method.

The invention further relates, according to an aspect thereof, to a computer program comprising program code means for performing all the steps of the method when said program is run on a computer.

The invention further relates, according to an aspect thereof, to a computer program product comprising program code means stored on a computer readable medium for performing all steps of the method when said program product is run on a computer.

The invention further relates, according to an aspect thereof, to a storage medium, such as a computer memory or a non-volatile data storage medium, for use in a computing environment, the memory comprising a computer readable program code to perform the method according to the invention.

The present invention also relates, according to an aspect thereof, to a computer program, computer program product and a storage medium for a computer all to be used with a computer for executing the method as described in any one of the above examples.

BRIEF DESCRIPTION OF DRAWINGS

In the following text, the invention will be described in detail with reference to the attached drawings. These schematic drawings are used for illustration only and do not in any way limit the scope of the invention. In the drawings.

EMBODIMENTS OF THE INVENTION

In future fuels a promising candidate for most diesel engines will include bio-diesel, or RME. The example studied here is RME, mixed in proportions 7%, 50% and 100% in diesel oil (VSD10). A 13 liter Euro V engine has been used as test object. In order to get a cost efficient detection of which blend of fuel the vehicle is filled with, e.g. the % content of bio-diesel, a combination of soft sensors is used.

By analysing the different influences on the engine at 7% and 100% RME a number of engine related parameters that could be measured by available sensors were listed (Table 1).

TABLE 1

Measured variables

| No. | Variable | ID | Unit |
|---|---|---|---|
| 1 | Torque | md | Nm |
| 2 | Exhaust manifold temperature | ACM.se_EngExhTemp | ° C. |
| 3 | Engine speed | APS_EngineSpeed_TS | rpm |
| 4 | Exhaust manifold pressure | ExhaustManifoldPressure | kPa |
| 5 | EGR mass flow | mfv_EgrMassFlowValidated | kg/s |
| 6 | Fuel Injection parameter 1 | rpc_Ipart | mg/str |
| 7 | Fuel Injection parameter 2 | rpc_MpropFlowDemand | mg/str |
| 8 | Fuel Injection parameter 3 | rpe_RailPressure | bar |
| 9 | Boost pressure | se_BoostPres | kPa |
| 10 | Boost temperature | se_BoostTemp | ° C. |
| 11 | NOx (pre cat) | se_NOxInLevel | ppm |
| 12 | NOx (post cat) | se_NOxOutLevel | ppm |
| 13 | Demanded torque | tc_TorqueValue | Nm |
| 14 | VGT position/demand | vsra_VgtPosSRA | % |
| 15 | Cooling water temperature (in) | T_W_I | ° C. |
| 16 | Cooling water temperature (out) | T_W_O | ° C. |

From those parameters, exhaust manifold temperature, engine speed, exhaust manifold pressure, EGR mass flow, a fuel Injection parameter, intake manifold pressure, intake manifold temperature, demanded torque, VGT position/demand and cooling water temperature were selected. All are detectable using current engine sensors used for a standard Euro V truck engine. Optionally, although ten parameters have been selected in this example, fewer or additional sensor signals can be selected.

This model is not directly applicable on other engine models. For instance, a Euro VI (EU standard for 2014) engine might have different sensors and some engine versions will include EGR and turbo-compound. This makes it necessary to recalibrate the model for each engine.

Figure 1:
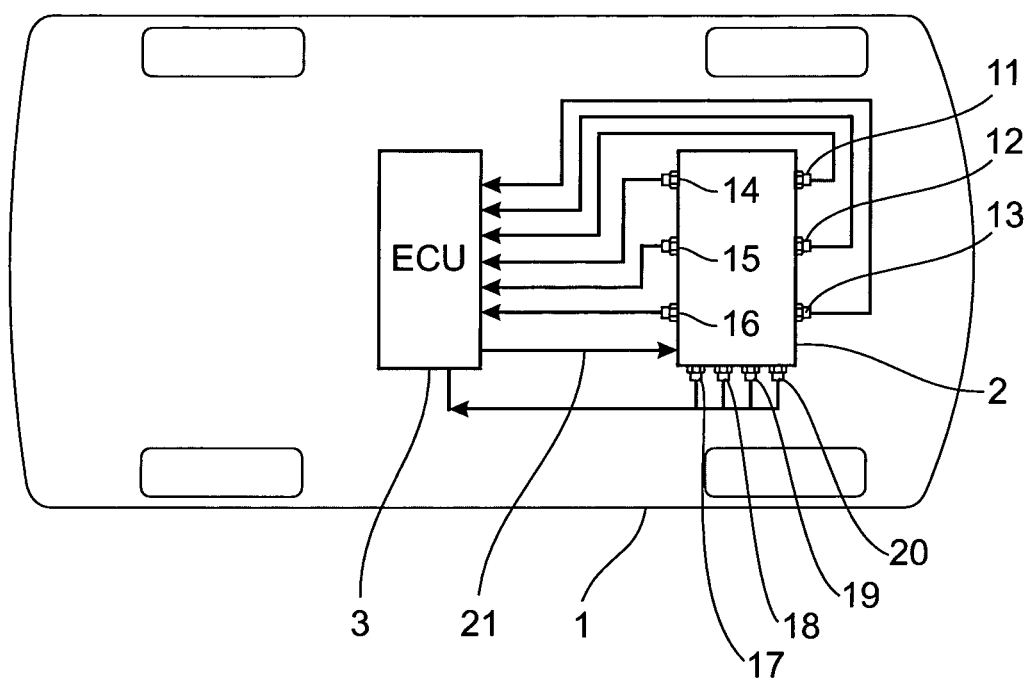
FIG. 1 shows a schematically illustrated vehicle provided with means for controlling an engine using a method according to the invention.

FIG. 1 shows a schematically illustrated vehicle provided with means for controlling an engine using a method according to the invention. The figure shows a schematic engine layout used for testing and validation of the inventive method. FIG. 1 shows a vehicle 1 provided with a compression ignition engine 2 controllable by an electronic control unit (ECU) 3. The engine 2 comprises an air intake manifold which is supplied with charge air from a turbocharger driven by exhaust gas from an exhaust manifold. A portion of the mass flow of exhaust gas is supplied directly to the intake manifold through an exhaust gas recirculation (EGR) conduit. Fuel is supplied to each individual combustion chamber through fuel injectors controlled by the ECU. Said devices are well known component parts of a modern internal combustion engine and will not be shown in the figure or be described in further detail.

The ECU 3 is connected to a large number of sensors supplying it with sensor signals necessary for controlling the engine 2.

FIG. 1 schematically indicates a limited number of sensors, including sensors for exhaust manifold temperature 11, engine speed 12, exhaust manifold pressure 13, EGR mass flow 14, a fuel Injection parameter 15, intake manifold pressure 16, intake manifold temperature 17, demanded torque 18, variable geometry turbocharger (VGT) position 19 and cooling water temperature 20. In this case, the fuel Injection parameter is the integral portion of the regulation for the fuel injection. The demanded torque is the torque demanded from the engine by the driver and can be detected using the accelerator position. Variable geometry turbochargers (VGT) are arranged to allow the effective aspect ratio (A/R) of the turbo to be altered as conditions change. The position of a controllable part of the VGT can be detected by a suitable sensor. The cooling water temperature can be measured at both the coolant inlet and the coolant outlet of the engine; in this case the outlet temperature is used.

The ECU 3 comprises a non-volatile memory in which is stored a model for estimating the RME percentage of the fuel mixture currently being injected. By using measured values from the above sensors and the stored model, the current RME percentage can be estimated. The ECU 3 can then control the fuel injectors via a conduit 21 to adjust of the fuel injection rate per engine cycle and the produced power from the engine. In addition, or alternatively, the current fuel blend can be used for controlling parameters such as the exhaust gas recirculation mass flow or the variable geometry turbocharger position.

The engine was operated in a transient cycle using B7 and B100, to measure and collect data and subsequently operated in transient state using B50 in the certification cycles. The model was trained in a transient cycle and tested in a transient cycle. All tests were performed in room temperature.

The engine was tested in different transient points and with the different blends of RME at certain throttle positions. Data for exhaust manifold temperature, engine speed, exhaust manifold pressure, EGR mass flow, a fuel Injection parameter, intake manifold pressure, intake manifold temperature, demanded torque, VGT position/demand and cooling water temperature were measured for each transient point for each RME blend.

The model output at time instant k is computed using a linear function of the predictor variables as where x(k) is a 1-by-nx matrix of predictor variables, y(k) is the scalar response variable, $\theta$ is a (nx+1)-by-1 matrix of regression coefficients, and r is the residual.

To increase the fitting of the model, the model is augmented by including past values (lags) of the predictor variables. If x(k) is the vector of values of the predictor variables at time instant k, then x(k−1) is the vector of values of the predictor variables at time instant k−1 or lagged one sample.

In this way, the model has more regressors, i.e. not only has the nx input variables but also lags of x(k). For example, when we consider the inputs lagged one sample, the model can be written as:

$$y(k)=[1 x(k)]\theta_0+x(k-1)\theta_1+r(k)=[1 x(k)x(k-1)]\theta+r(k).$$

In a general way, the set of regressors with lagged input data values is formulated as:

$$[x(k),x(k-n_{x1}),x(k-2n_{x1}),\ldots,x(k-n_{x2})],$$

where $n_{x1}$ and $n_{x2}$ are parameters that define the time lags for the input variables. For example, if $n_{x1}=4$, $n_{x2}=8$, the set of regressors is $$[x(k),x(k-4),x(k-8)].$$

Finally, cross-product terms are also included in the model. These terms represent interaction effects between the predictor variables. The set of regressors can be expressed as follows $$[x(k),x(k-n_{x1}),x(k-2n_{x1}),\ldots,x(k-n_{x2}),$$

$$z(k),z(k-n_{x1}),z(k-2n_{x1}),\ldots,z(k-n_{x2})]$$

where z is a vector of the cross-product terms $$[x_1 x_2, x_1 x_3, \ldots, x_1 x_{nx}, x_2 x_3, \ldots, x_2 x_{nx}, \ldots, x_{nx-1} x_{nx}].$$

To smooth out fluctuations in the model over time, a cumulative average of all of the response variable estimates up until the current data value, $$\bar{y}(k) = \frac{y(1) + \ldots + y(k)}{k} = \frac{y(k) + (k-1)\bar{y}(k-1)}{k}$$

where $\bar{y}(0)=0$

To increase the fitting of the model, and hence the accuracy of it, data values are excluded when a set of conditions is not satisfied. This set states (I) a range for each model input variable at the current time, $$x_{i,min} \leq x_i(k) \leq x_{i,max}$$

$i=1 \ldots n_x$ (II) a minimum engine power demand (power is calculated from demanded torque and speed, and C is a conversion factor), $$tc\_TorqueValue(k)*APS\_EngineSpeed\_TS(k)*C \geq power\_min$$

When the predictor variables satisfy conditions (I) and (II), the FQM output y(k) is considered valid.

Figure 2:
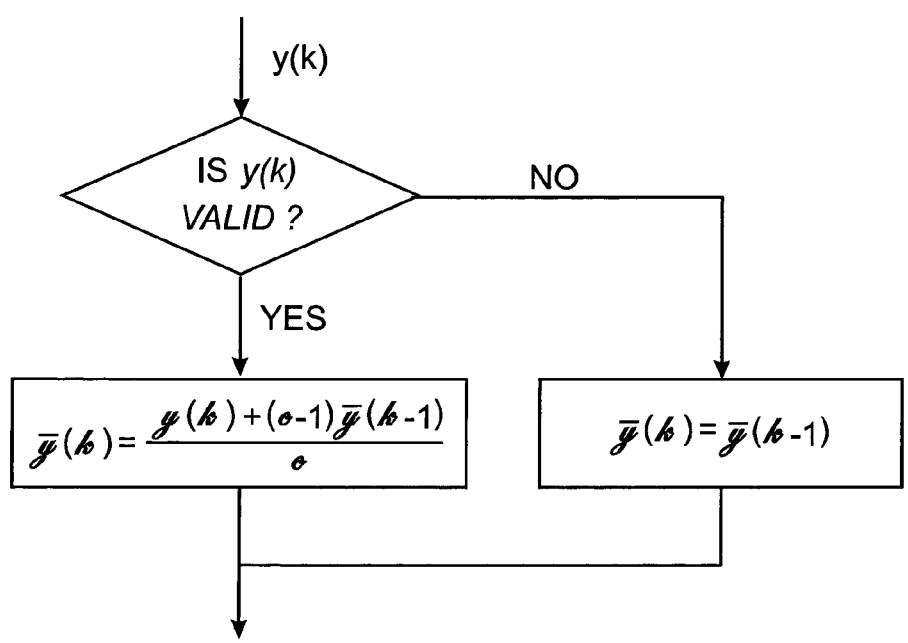
FIG. 2 shows a flow chart of a part of the FQM algorithm.

The cumulative average, mentioned at the end of the previous section, calculates the average of only the valid estimates up until the current data value (see FIG. 2).

A PLS model with 10 input variables (listed in Table) and two time lags of 0.4 s ($n_{x1}=4$) and 0.8 s ($n_{x2}=8$) for each input variable, is developed in order to detect the RME content. Table also shows the minimum and maximum values for each variable. The minimum and maximum values are engine-cycle dependant, i.e. they depend on the engine and cycle used for model calibration, and they are obtained automatically from a Matlab™ script written for this purpose. As explained in the previous section, all the current measurements of the 10 input variables should be inside the min-max range to get a valid model evaluation, as well as the demanded power should be greater than equal to 75 kW:

$$x_{i,min} \leq x_i(k) \leq x_{i,max}$$

i=1 ... 10 tc_TorqueValue(k)*APS_EngineSpeed_TS(k)*C≥75 kW

TABLE 2

Model input variables

| Variable | ID | Unit | Min | Max |
| --- | --- | --- | --- | --- |
| Exhaust manifold temperature | ACM.se_EngExhTemp | ° C. | 208.66 | 372.43 |
| Engine speed | APS_EngineSpeed_TS | rpm | 840.4 | 1864.6 |
| Exhaust manifold pressure | ExhaustManifoldPressure | kPa | 9.23 | 256.39 |
| EGR mass flow | mfv_EgrMassFlowValidated | kg/s | 0 | 0.0535 |
| Fuel Injection parameter | rpc_Integral part inj. fuel | mg/str | −4.04 | 21.22 |
| Boost pressure | se_BoostPres | kPa | 110.55 | 266.77 |
| Boost temperature | se_BoostTemp | ° C. | 53.36 | 64.05 |
| Demanded torque | tc_TorqueValue | Nm | 417.5 | 1225.5 |
| VGT position/demand | vsra_VgtPosSRA | % | 1.3 | 46 |
| Cooling water temperature | T_W_I | ° C. | 86.3 | 93.3 |

The model was calibrated using data coming from engine tests performed with 7% and 100% RME content. The engine test cycles used for calibration are 'Duty Cycle' (City3 cycle), 'WHTC', and 'WHSC'.

Table shows the part of each cycle, using 7% or 100% RME content, that is valid, i.e. the constraints of the input data are satisfied. About 15% of each cycle is used for calibration, and these time instants are distributed along the tests time.

TABLE 3

Part of the cycle valid for calibration

| | Duty Cycle | WHTC | WHSC |
| --- | --- | --- | --- |
| 7% RME content | 15.8 | 15.4 | 14.8 |
| 100% RME content | 13.4 | 13.1 | 21.8 |

Figure 3A:
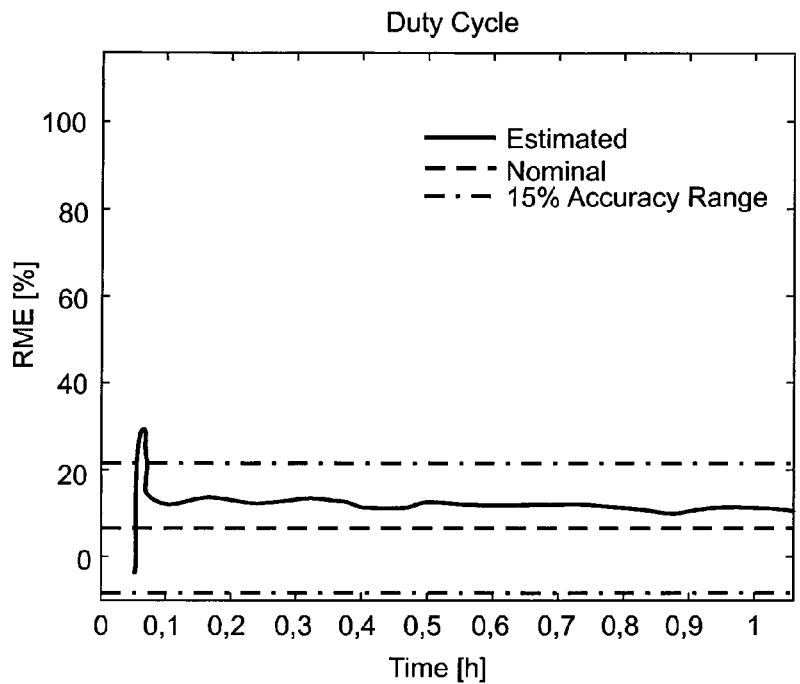
FIG. 3A shows a diagram plotting Duty Cycle calibration results with 7% RME content.
Figure 3B:
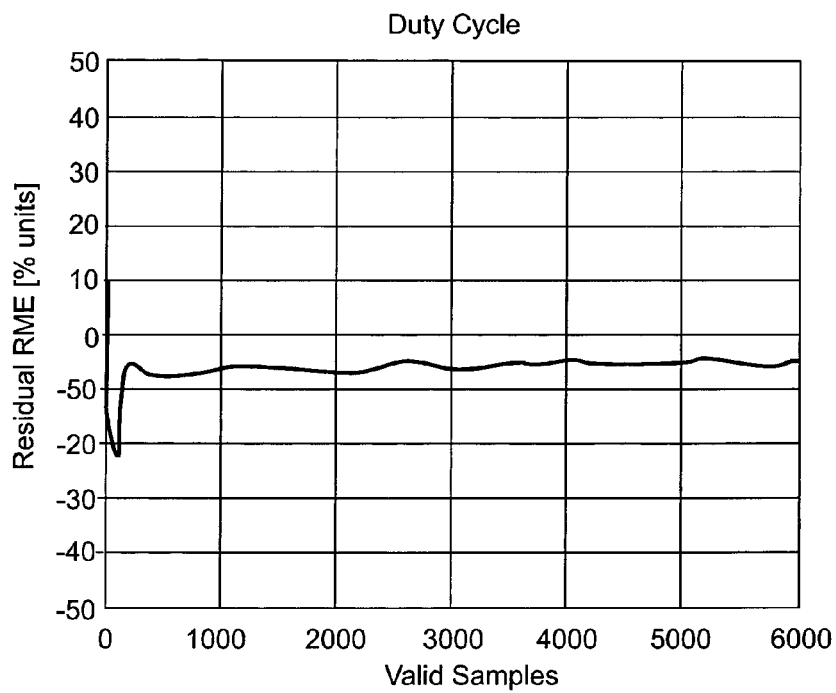
FIG. 3B shows a diagram plotting Duty Cycle calibration results from FIG. 3A for residual RME.
Figure 4A:
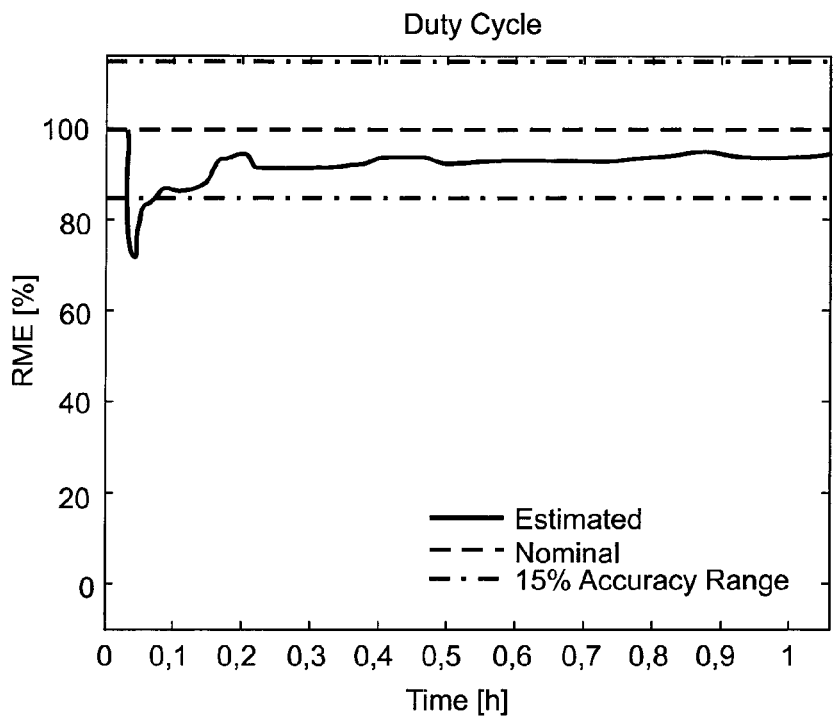
FIG. 4A shows a diagram plotting Duty Cycle calibration results with 100% RME content.
Figure 4B:
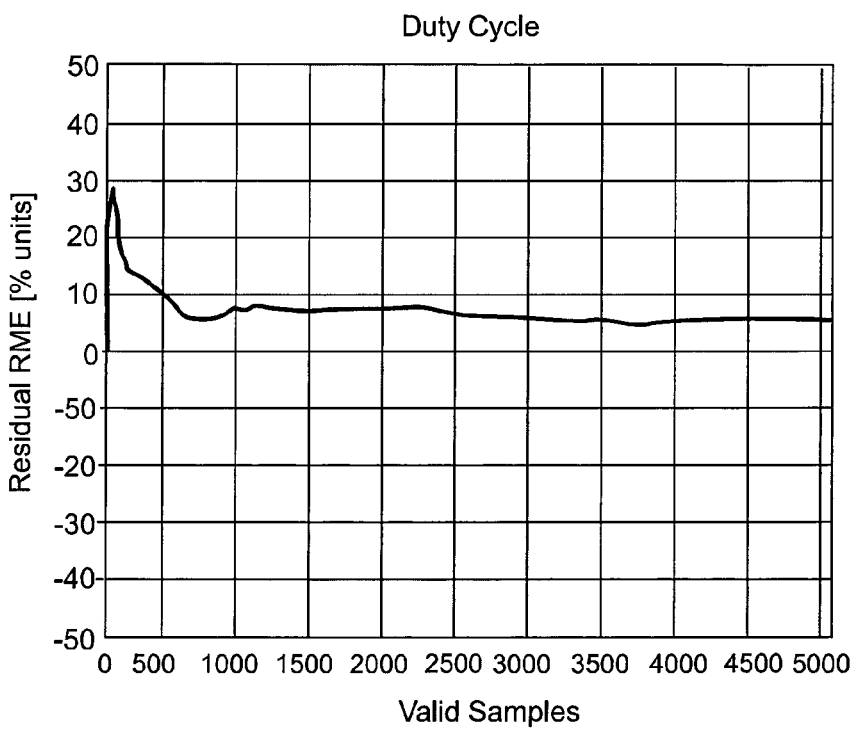
FIG. 4B shows a diagram plotting Duty Cycle calibration results from FIG. 4A for residual RME.
Figure 5A:
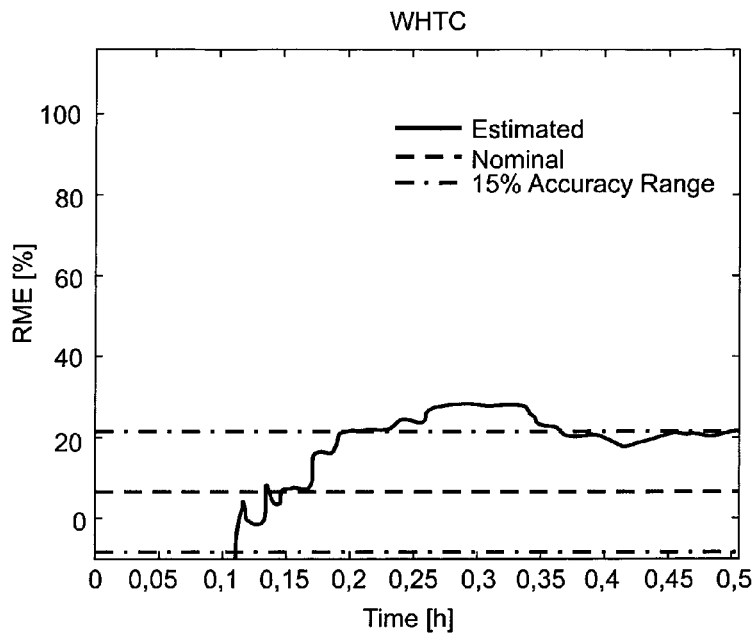
FIG. 5A shows a diagram plotting WHTC calibration results with 7% RME content.

FIGS. 3A-3B and FIGS. 4A-4B show the results from Duty Cycle with 7% and 100% RME content, respectively. After about 0.2 h of the beginning of the tests, the model converges to values within ±8% FSO (full scale output) of the nominal ones, as can be seen in FIGS. 3A and 4A. FIGS. 3B and 4B show that the estimation RME residuals are within ±5% units at the end of the cycle. In FIGS. 3A, 4A, 5A and up to 11A, full lines represent estimated values, dashed lines represent nominal values, and dash-dotted lines represent a desired 15% accuracy range on either side of the nominal value.

Figure 5B:
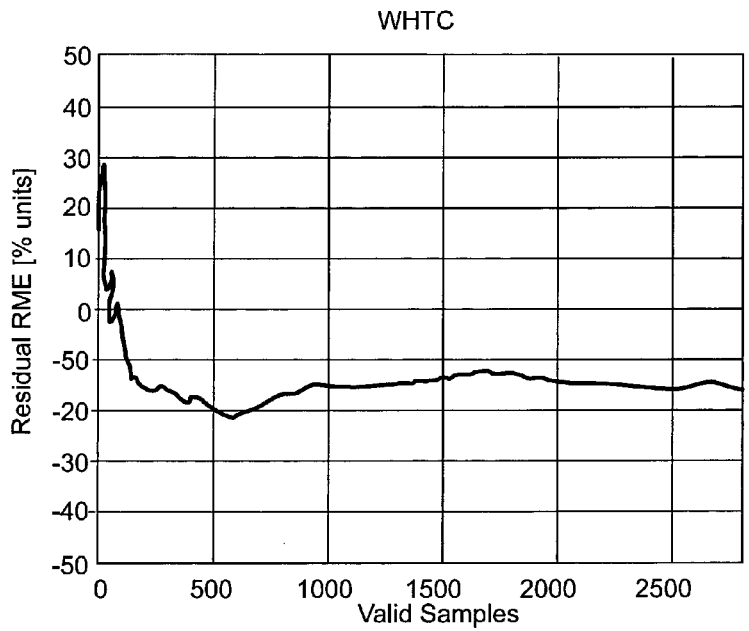
FIG. 5B shows a diagram plotting WHTC calibration results from FIG. 5A for residual RME.
Figure 6A:
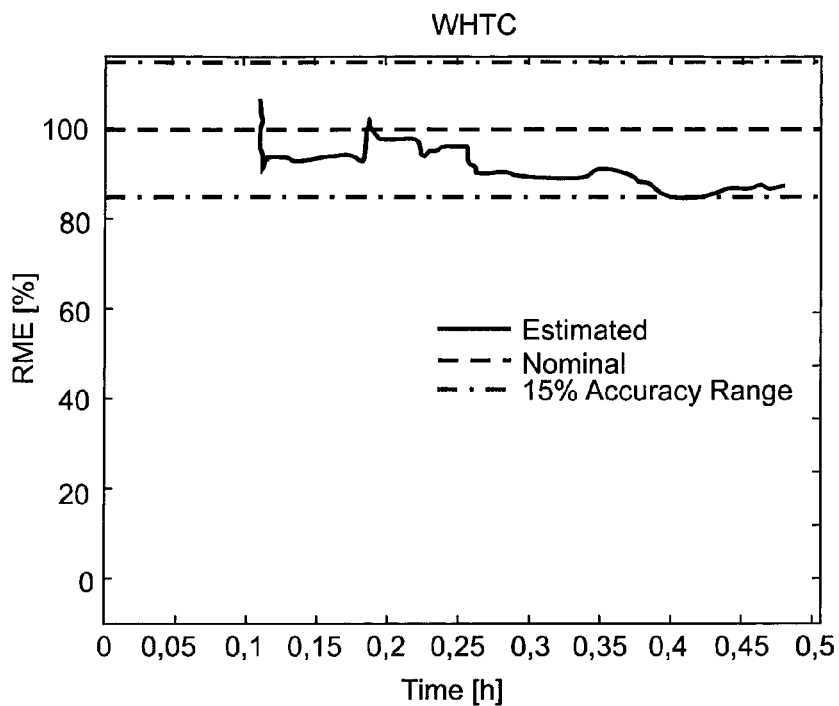
FIG. 6A shows a diagram plotting WHTC calibration results with 100% RME content.
Figure 6B:
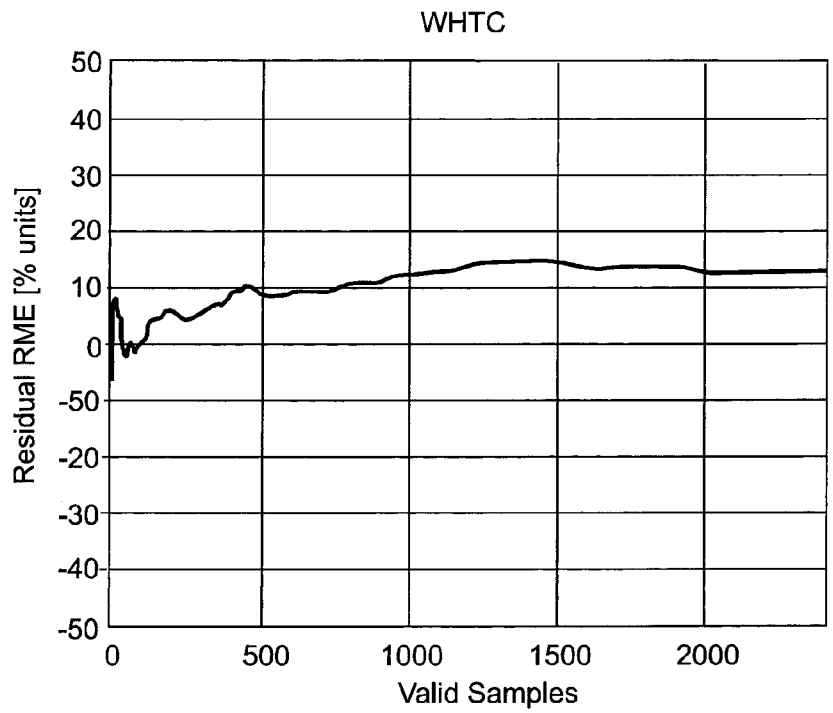
FIG. 6B shows a diagram plotting WHTC calibration results from FIG. 6A for residual RME.

FIGS. 5A-5B and FIGS. 6A-6B show the calibration results from a WHTC cycle with 7% and 100% RME content, respectively. After about 0.2 h of the beginning of the tests, the model converges to values within ±8% FSO (full scale output) of the nominal ones, as can be seen in FIGS. 5A and 6A. At the end of the cycle, about 0.5 h from the beginning of the cycle, the model converges to values within ±15% units, as indicated in FIGS. 5B and 6B.

Figure 7A:
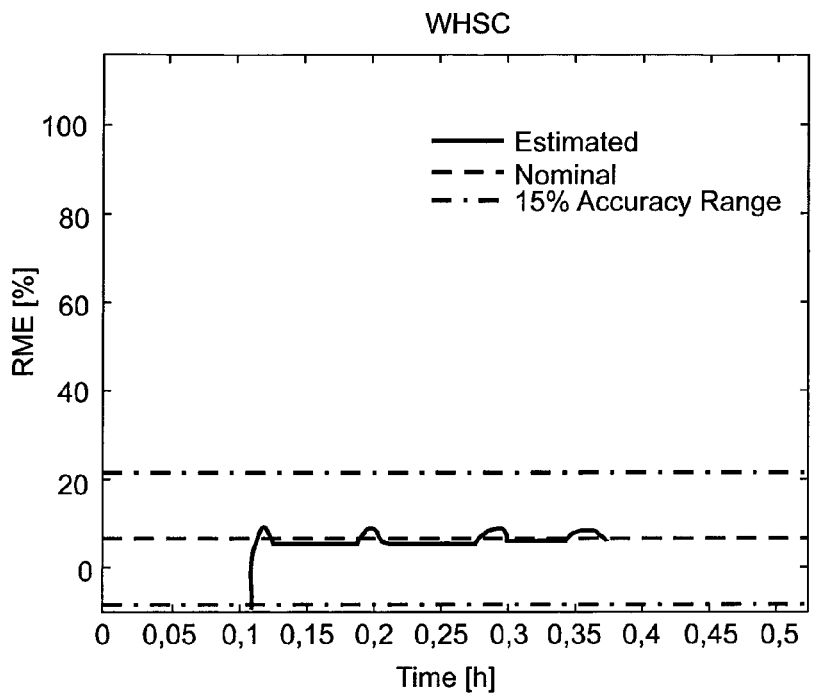
FIG. 7A shows a diagram plotting WHSC calibration results with 7% RME content.
Figure 7B:
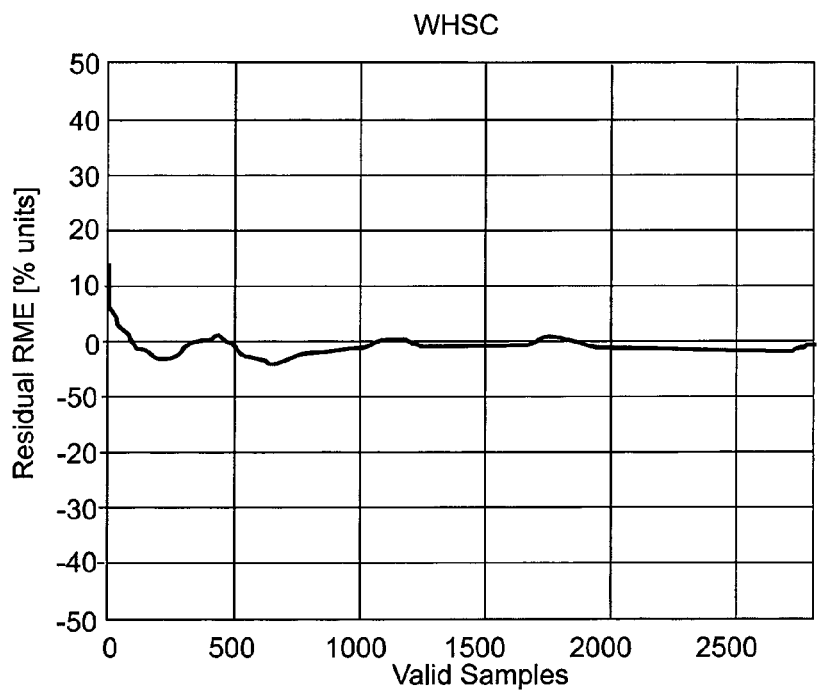
FIG. 7B shows a diagram plotting WHSC calibration results from FIG. 7A for residual RME.
Figure 8A:
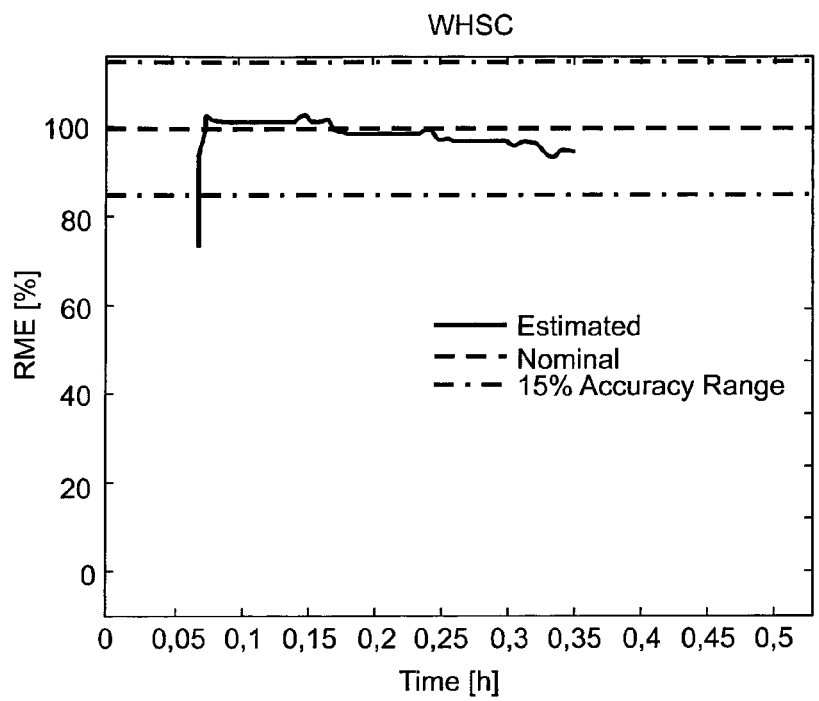
FIG. 8A shows a diagram plotting WHSC calibration results with 100% RME content.
Figure 8B:
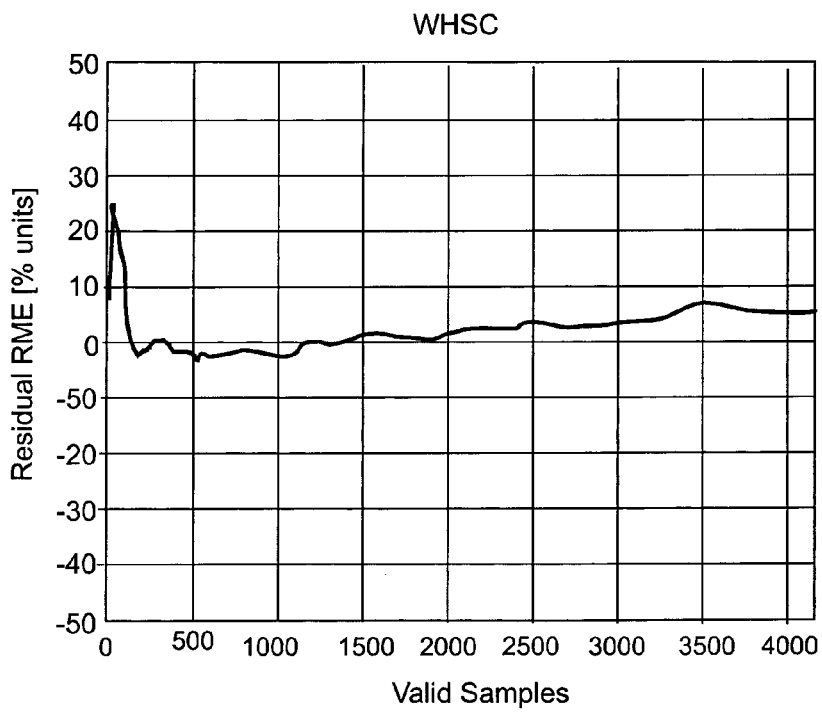
FIG. 8B shows a diagram plotting WHSC calibration results from FIG. 8A for residual RME.

Finally, FIGS. 7A-7B and FIGS. 8A-8B show the calibration results from a WHSC cycle with 7% and 100% RME content, respectively. After about 0.2 h of the beginning of the tests, the model converges to values within ±8% FSO (full scale output) of the nominal ones, as can be seen in FIGS. 7A and 8A. After the initial transient, the estimation RME residuals are always within ±5% units of the nominal ones, as indicated in FIGS. 7B and 8B.

The model was validated using data coming from engine tests performed with 50% RME content. The engine test cycles considered for validation are 'Duty Cycle' (City3 cycle), 'WHTC', and 'WHSC'.

Figure 9A:
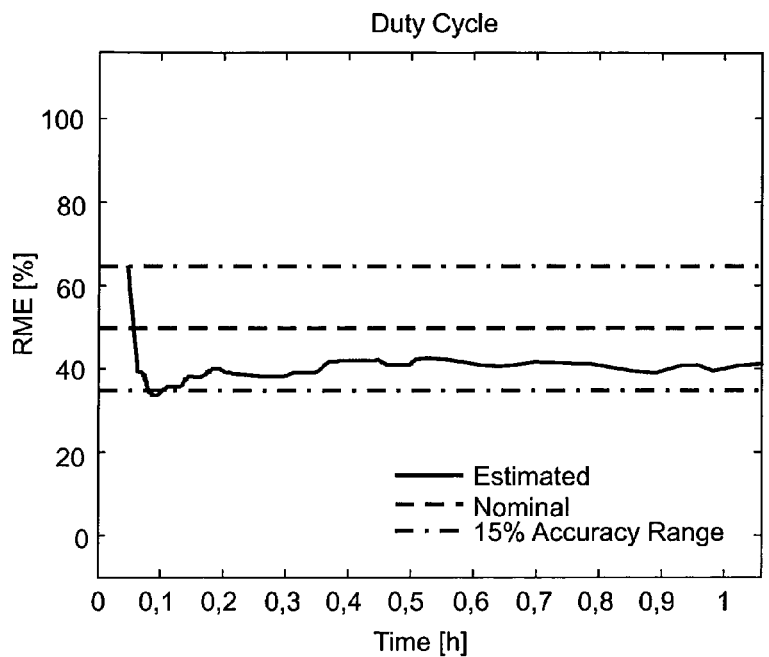
FIG. 9A shows a diagram plotting Duty Cycle validation results with 50% RME content.
Figure 9B:
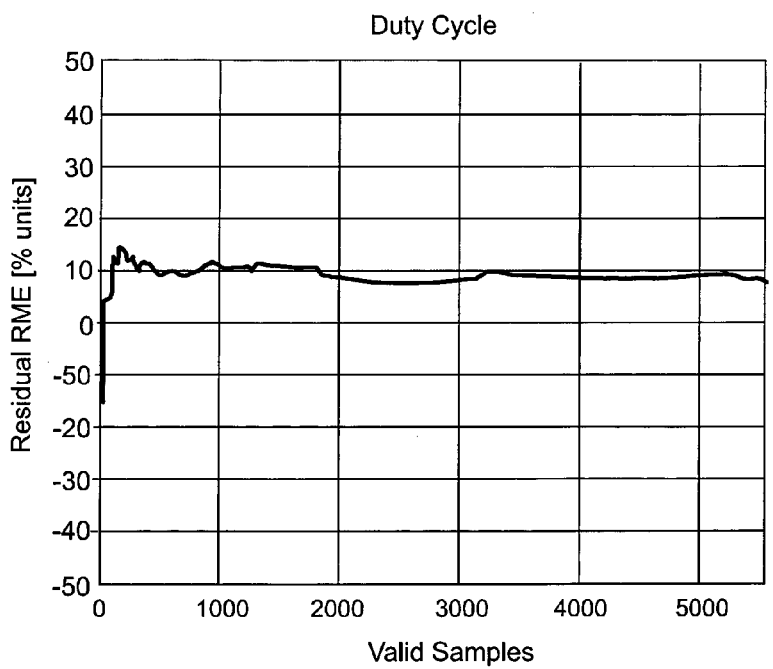
FIG. 9B shows a diagram plotting Duty Cycle validation results from FIG. 9A for residual RME
Figure 10A:
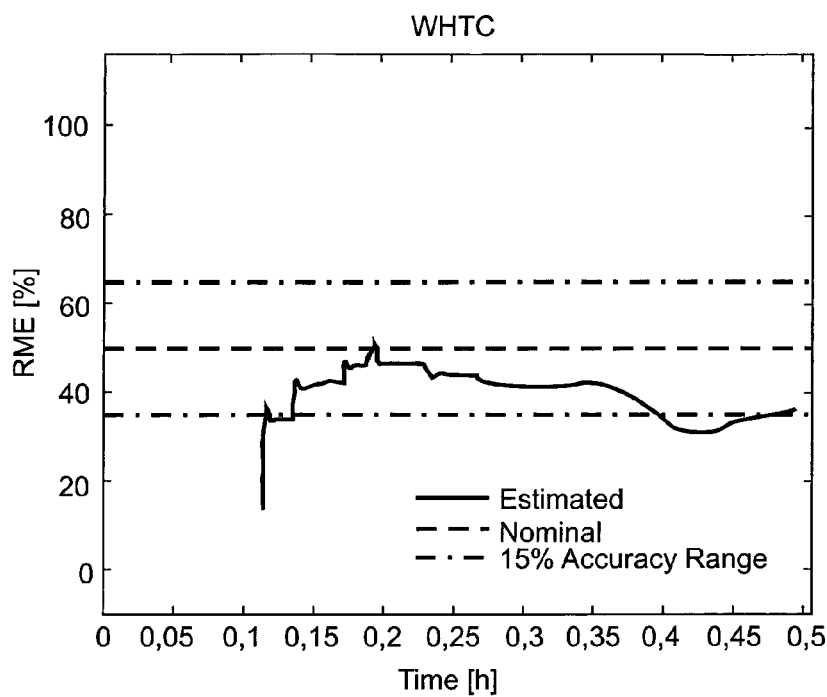
FIG. 10A shows a diagram plotting WHTC validation results with 50% RME content.
Figure 10B:
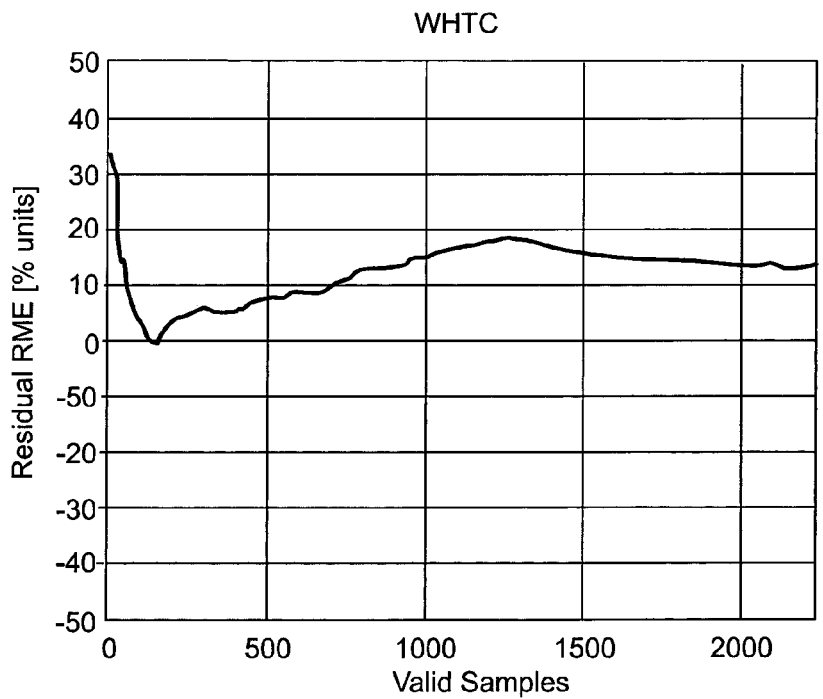
FIG. 10B shows a diagram plotting WHTC validation results from FIG. 10A for residual RME.
Figure 11A:
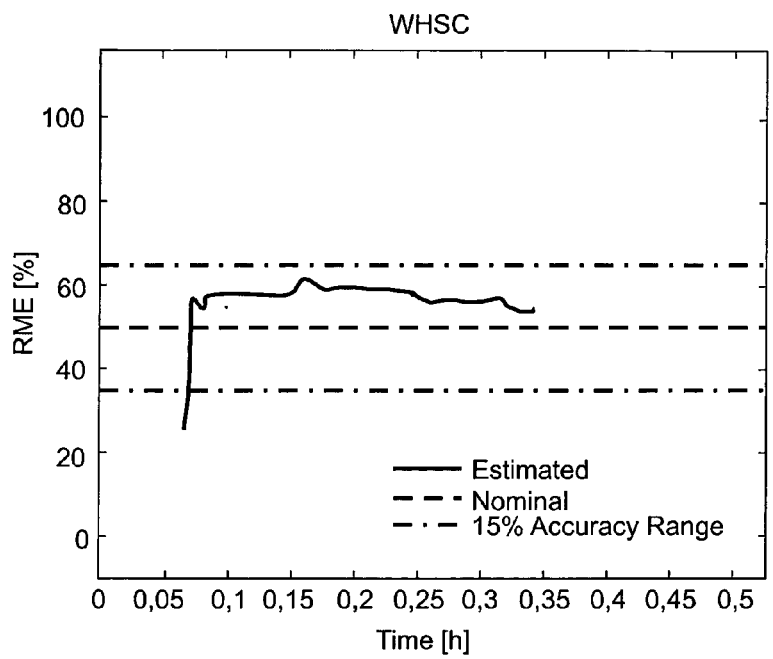
FIG. 11A shows a diagram plotting WHSC validation results with 50% RME content.
Figure 11B:
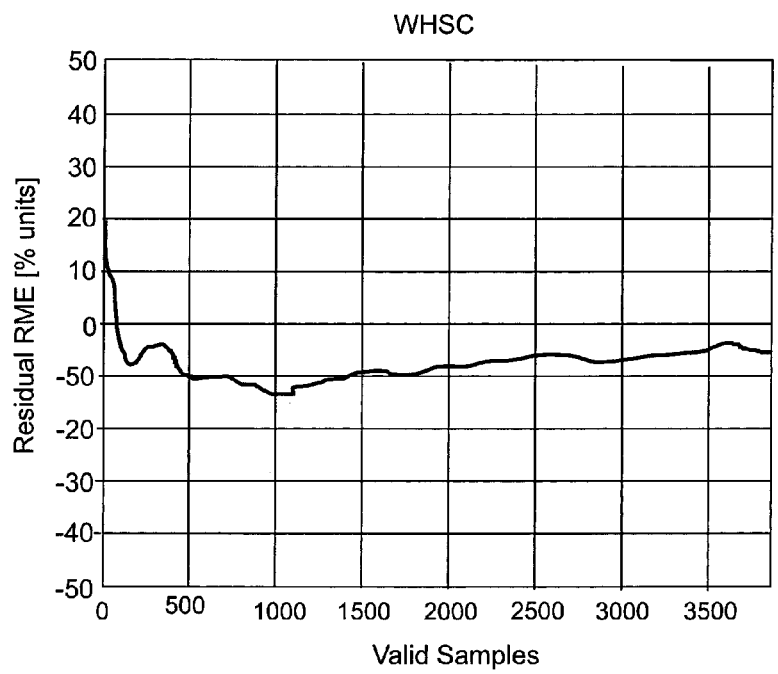
FIG. 11B shows a diagram plotting WHSC validation results from FIG. 11A for residual RME.

FIGS. 9A-9B, FIGS. 10A-10B and FIGS. 11A-11B show the validation results for Duty Cycle, WHTC, and WHSC, respectively. As can be seen in FIGS. 9A, 10A and 11A the estimated RME content is at the end of all the three cycles within ±15% FSO (full scale output) of the nominal RME contents. After the initial transient, the estimation RME residuals are always within ±5% units of the nominal ones, as indicated in FIGS. 9B, 10B and 11B.

The model indicated above can provide a desired accuracy for estimation of the RME content of the fuel to optimize both the fuel consumption information of the engine and the torque produced by the engine. The electronic control unit can use the selected model during transient operation. By providing the electronic control unit with measured transient data, the model can be used for estimation of the RME content, allowing for adjustment of the fuel injection rate per engine cycle and the produced power from the engine. In addition, or alternatively, the current fuel blend can be used for controlling parameters such as the exhaust gas recirculation mass flow or the variable geometry turbocharger position.

As indicated above a transient model determined for one engine model is not directly applicable on other engine models. This makes it necessary to recalibrate the transient model for each engine model, using the method described above. When recalibrating the transient model for different engine models it is also possible to select different or other combinations of engine parameters. The selection of engine parameters is dependent on their relevance to the RME content of the fuel.

The present invention also relates to a computer program, computer program product and a storage medium for a computer all to be used with a computer for executing the method as described in any one of the above examples.

Figure 12:
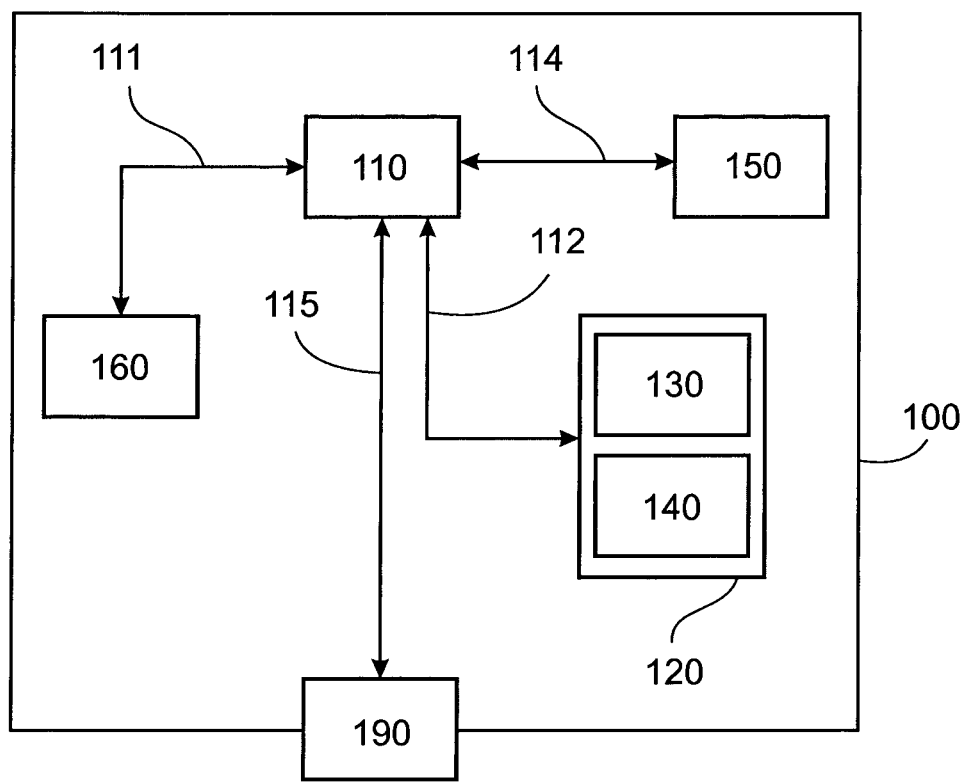
FIG. 12 shows the invention applied on a computer arrangement.

FIG. 12 shows an apparatus 100 according to one embodiment of the invention, comprising a non-volatile memory 120, a processor 110 and a read and write memory 160. The memory 120 has a first memory part 130, in which a computer program for controlling the apparatus 100 is stored. The computer program in the memory part 130 for controlling the apparatus 100 can be an operating system.

The apparatus 100 can be enclosed in, for example, a control unit, such as the control unit 3. The data-processing unit 110 can comprise, for example, a microcomputer.

The memory 120 also has a second memory part 140, in which a program for controlling the target gear selection function according to the invention is stored. In an alternative embodiment, the program for controlling the transmission is stored in a separate non-volatile storage medium 150 for data, such as, for example, a CD or an exchangeable semiconductor memory. The program can be stored in an executable form or in a compressed state.

When it is stated below that the data-processing unit 110 runs a specific function, it should be clear that the data-processing unit 110 is running a specific part of the program stored in the memory 140 or a specific part of the program stored in the non-volatile storage medium 150.

The data-processing unit 110 is tailored for communication with the storage memory 150 through a data bus 114. The data-processing unit 110 is also tailored for communication with the memory 120 through a data bus 112. In addition, the data-processing unit 110 is tailored for communication with the memory 160 through a data bus 111. The data-processing unit 110 is also tailored for communication with a data port 190 by the use of a data bus 115.

The method according to the present invention can be executed by the data-processing unit 110, by the data-processing unit 110 running the program stored in the memory 140 or the program stored in the non-volatile storage medium 150.

The invention should not be deemed to be limited to the embodiments described above, but rather a number of further variants and modifications are conceivable within the scope of the following patent claims.

The invention claimed is:

1. A method for determining fuel blend in a dual fuel mixture comprising a first and a second fuel in an internal combustion engine, comprising:
   measuring multiple engine parameters using sensors during transient cycle operation for a predetermined range of engine loads and fuel blends;
   using system identification of transient time series of the measurements to determine one or more relevant engine parameters;
   determining a model for estimation of the fuel blend based on the one or more engine parameters;
   training the model in transient mode using data from engine tests performed with a predetermined fuel blend;
   using the model for determining a current fuel blend during transient operation using current measured values of the one or more engine parameters, and
   using the calculated current fuel blend for controlling an engine in response to the current fuel blend.

2. A method according to claim 1, comprising using actual and time delayed, linear and cross-terms, in-data during system identification to determine the relevant parameters.

3. A method according to claim 1, wherein at least one engine parameter comprises exhaust manifold temperature.

4. A method according to claim 1, wherein at least one engine parameter comprises engine speed.

5. A method according to claim 1, wherein at least one engine parameter comprises exhaust manifold pressure.

6. A method according to claim 1, wherein at least one engine parameter comprises exhaust gas recirculation mass flow.

7. A method according to claim 1, wherein at least one engine parameter comprises the integral portion of the regulation for the fuel injection.

8. A method according to claim 1, wherein at least one engine parameter comprises intake manifold pressure.

9. A method according to claim 1, wherein at least one engine parameter comprises intake manifold temperature.

10. A method according to claim 1, wherein at least one engine parameter comprises a torque value demanded by the engine control unit.

11. A method according to claim 1, wherein at least one engine parameter comprises variable geometry turbocharger position.

12. A method according to claim 1, wherein at least one engine parameter comprises cooling water temperature.

13. Vehicle wherein the vehicle comprises an internal combustion engine arranged to be controlled by a method according to claim 1.

14. A computer comprising a computer program for performing all the steps of claim 1 when the program is run on the computer.

15. A non-transitory computer program product comprising program code stored on a non-transitory computer readable medium for performing all steps of claim 1 when the program product is run on a computer.

16. A non-transitory storage medium, comprising a computer readable program code to perform the method claim 1.

* * * * *